United States Patent
Kano et al.

(10) Patent No.: US 8,838,468 B2
(45) Date of Patent: Sep. 16, 2014

(54) SYSTEM AND METHOD FOR ANALYZING AND MANAGING BUSINESS PERFORMANCE

(75) Inventors: Makoto Kano, Yokohama (JP); Akio Koide, Yokohama (JP); Te-Kai Liu, Mount Kisco, NY (US); Bala Ramachandran, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 1408 days.

(21) Appl. No.: 12/058,122

(22) Filed: Mar. 28, 2008

(65) Prior Publication Data

US 2008/0208660 A1    Aug. 28, 2008

Related U.S. Application Data

(63) Continuation of application No. 11/034,253, filed on Jan. 13, 2005, now abandoned.

(51) Int. Cl.
*G06Q 10/00* (2012.01)
*G06Q 10/06* (2012.01)
*G06Q 10/04* (2012.01)

(52) U.S. Cl.
CPC .......... *G06Q 10/04* (2013.01); *G06Q 10/06375* (2013.01); *G06Q 10/0639* (2013.01); *G06Q 10/067* (2013.01); *G06Q 10/06* (2013.01)
USPC ........................................ 705/7.37; 705/7.27

(58) Field of Classification Search
CPC ............ G06Q 10/06375; G06Q 10/06; G06Q 10/0639; G06Q 10/04; G06Q 10/063
USPC ............................................. 705/7.37, 7.27
See application file for complete search history.

(56) References Cited

U.S. PATENT DOCUMENTS

| 6,560,569 | B1 | | 5/2003 | Abu El Ata | |
| 6,795,868 | B1 | * | 9/2004 | Dingman et al. | 709/246 |
| 6,990,437 | B1 | * | 1/2006 | Abu El Ata | 703/2 |
| 7,162,427 | B1 | * | 1/2007 | Myrick et al. | 705/348 |

(Continued)

OTHER PUBLICATIONS

Young M Lee, Steve Buckley, Nathan Caswell, Anil Nigam, Bala Ramachandran, "Business Process Modeling for an Opportunity Management Process" 2003, IIE Annual Conference Proceedings. Norcross: 2003. p. 1 (6 pages).*

(Continued)

*Primary Examiner* — Tiphany Dickerson
(74) *Attorney, Agent, or Firm* — Whitham, Curtis, Christofferson & Cook, P.C.; Daniel P. Morris

(57) ABSTRACT

A system and method for analyzing and managing business performance by designing and evaluating the performance of a business process model comprising a flow of business tasks and artifact sources that generate business artifacts. Business processes may be parsed to identify transformation opportunities meeting transformation conditions specified in a transformation knowledge. One or more identified transformation opportunities may be adopted, and parts of the process may be transformed according to transformation rules specified in a transformation knowledge. Analytics and computer simulation may be employed to evaluate business performance metrics of each of said transformed business processes. Iterative changes may be made to said business processes to manage business performance, reiterating transformation and evaluation steps until a satisfactory business process model is obtained. The resulting output is finally produced as a business process model in machine-readable format and can be deployed to a business environment.

14 Claims, 14 Drawing Sheets

(56) References Cited

U.S. PATENT DOCUMENTS

| | | | |
|---|---|---|---|
| 7,283,986 B2* | 10/2007 | Okunseinde et al. | 1/1 |
| 7,548,872 B2* | 6/2009 | Keay et al. | 705/7.25 |
| 7,711,590 B2* | 5/2010 | Andrews et al. | 705/7.36 |
| 7,908,161 B2* | 3/2011 | Benayon et al. | 705/7.11 |
| 2001/0053991 A1 | 12/2001 | Bonabeau | |
| 2002/0049573 A1 | 4/2002 | El Ata | |
| 2003/0033182 A1* | 2/2003 | Stok et al. | 705/7 |
| 2003/0120528 A1* | 6/2003 | Kruk et al. | 705/7 |
| 2003/0167254 A1* | 9/2003 | Su et al. | 707/1 |
| 2004/0006566 A1* | 1/2004 | Taylor et al. | 707/100 |
| 2004/0015381 A1* | 1/2004 | Johnson et al. | 705/8 |
| 2004/0138933 A1* | 7/2004 | LaComb et al. | 705/7 |
| 2005/0049911 A1* | 3/2005 | Engelking et al. | 705/11 |
| 2005/0060224 A1* | 3/2005 | Ricketts | 705/11 |
| 2005/0091093 A1* | 4/2005 | Bhaskaran et al. | 705/7 |
| 2005/0114147 A1 | 5/2005 | Jumaran et al. | |
| 2005/0203784 A1* | 9/2005 | Rackham | 705/7 |
| 2006/0089943 A1* | 4/2006 | Creel et al. | 707/102 |

OTHER PUBLICATIONS

Ramachandran, B. et al., Business Process Transformation Patterns and the Business Process Transformation Wizard, Proceedings of the 2006 Winter Simulation Conference, p. 636-641.*

Young M Less, Steve Buckley, Nathan Caswell, Anil Nigam, Bala Ramachandran, "Business Process Modeling for an Opportunity Management Process" 2003, IIE Annual Conference Proceedings, Norcross:2003. p. 1 (6 pages).

A. Nigam and N.S. Caswell, "Business Artifacts: An Operational Specification", 2003. IBM Systems Journal, vol. 42, No. 3. pp. 428-445.

* cited by examiner

As-Is Process

Parsing by one task

Parsing by neighboring two tasks

431a

```
<TransformationPointCondition>
  <TwoActivities>
    <OrgTask1>
      <ITResource isExisting="true" />
      <HumanResource isExisting="true" />
    </OrgTask1>
    <OrgTask2>
      <ITResource isExisting="true" />
      <HumanResource isExisting="true" />
    </OrgTask2>
    <OrgConnection_OrgTask1--OrgTask2>
      <AssociatedBusinessItem isElectronic="false" isDocument="true" />
    </OrgConnection_OrgTask1--OrgTask2>
  </TwoActivities>
</TransformationPointCondition>
```

*Figure 9*

```
<TransformationRule>
    <TopologyTransformation>                                                    443a
        <Task TaskName="OrgTask1"/>
        <Task TaskName="ICSTask_OrgTask1_OrgTask2"/>
        <Task TaskName="OrgTask2"/>
        <Connection
            ConnectionName="Connection_OrgTask1--ICSTask"
            FromTaskName="OrgTask1" ToTaskName="ICSTask_OrgTask1_OrgTask2"
            AssociatedBusinessItemName="OrgMessage_OrgTask1--OrgTask2"/>
        <Connection
            ConnectionName="Connection_ICSTask--OrgTask2"
            FromTaskName="ICSTask_OrgTask1_OrgTask2" ToTaskName="OrgTask2"
            AssociatedBusinessItemName="OrgMessage_OrgTask1--OrgTask2"/>
    <TopologyTransformation>

<ResourceAssignmentChange TaskName="ICSTask_OrgTask1_OrgTask2">
        <ITResource ResourceName="ICS Software"/>
    </ResourceAssignmentChange>                                                 444a <AttributeChange>                                                           445a
        <ResourceAttribute                                                      458a
            TaskName="OrgTask1" ResourceName="OrgTask1_HumanResource">
            <TimeRequired>
                <ReasonofChange>There is no need for printing & delivering document
                </ReasonofChange>
                <Subtraction Value="10" Unit="minute"/>
            </TimeRequired>
        </ResourceAttribute>
        <ResourceAttribute
            TaskName="ICSTask_OrgTask1_OrgTask2" ResourceName="ICS Software">
            <TimeRequired>
                <NewValue Value ="100 Unit="msec"/>
            </TimeRequired>
        </ResourceAttribute>
        <ResourceAttribute
            TaskName="OrgTask2" ResourceName="OrgTask2_HumanResource">
            <TimeRequired>
                <ReasonofChange>
                    There is no need for entering information into the application
                </ReasonofChange>
                <Subtraction Value="10" Unit="minute"/>
            </TimeRequired>
        </ResourceAttribute>

<BusinessItemAttribute                                                  459a
            ConnectionName="Connection_OrgTask1--ICSTask"
            BusinessItemName="OrgMessage_OrgTask1--OrgTask2"
            IsDocument="true" IsElectronic="true"/>
        <BusinessItemAttribute
            ConnectionName="Connection_ICSTask--OrgTask2"
            BusinessItemName="OrgMessage_OrgTask1--OrgTask2"
            IsDocument="true" IsElectronic="true"/>
    </AttributeChange>
</TransformationRule>
```

Figure 10

```
<InvestmentAndDevelopment Name="ICS software license" IsCountable="false"/>
<InvestmentAndDevelopment
Name="Development of Adapter for OrgTask1_ITResource_ProductName" IsCountable="false"/>
  <Param Name="ApplicationType" Value="OrgTask1_ITResource_ApplicationType"/>
  <Param Name="ProductName" Value="OrgTask1_ITResource_ProductName"/>
</InvestmentAndDevelopment>
<InvestmentAndDevelopment
Name="Development of Adapter for OrgTask2_ITResource_ProductName" IsCountable="false"/>
  <Param Name="ApplicationType" Value="OrgTask2_ITResource_ApplicationType"/>
  <Param Name="ProductName" Value="OrgTask2_ITResource_ProductName"/>
</InvestmentAndDevelopment>
<InvestmentAndDevelopment
Name="Development of Collaboration_OrgTask1_OrgTask2" IsCountable="false"/>
  <Param Name="InputITResource_ApplicationType"
Value="OrgTask1_ITResource_ApplicationType"/>
  <Param Name="InputITResource_ProductName" Value="OrgTask1_ITResource_ProductName"/>
  <Param Name="OutputITResource_ApplicationType"
Value="OrgTask2_ITResource_ApplicationType"/>
  <Param Name="OutputITResource_ProductName" Value="OrgTask2_ITResource_ProductName"/>
</InvestmentAndDevelopment>
<InvestmentAndDevelopment Name="Maintenance of ICS system" IsCountable="true"/>
<InvestmentAndDevelopment Name="HW cost" IsCountable="true"/>
```

*Figure 11*

```
<TransformationPointCondition>
  <OneActivity>
    <OrgTask1>
      <ITResource isExisting="false" />
      <HumanResource isExisting="true" Role="DataAnalyst"/>
    </OrgTask1>
  </OneActivity>
</TransformationPointCondition>
```

*Figure 13*

```
<TransformationRule>
  <ResourceAssignmentChange TaskName=OrgTask1">
    <ITResource ResourceName="Excel"/>
  </ResourceAssignmentChange>

<AttributeChange>
    <ResourceAttribute
        TaskName="OrgTask1" ResourceName="OrgTask1_HumanResource">
      <TimeRequired>
        <NewValue Value ="20" Unit="minute"/>
        <Multiplication Base="OrgTask1_HumanResource_TimeRequired"
    Value="0.2" Unit="minute"/>
      </TimeRequired>
    </ResourceAttribute>
    <ResourceAttribute
        TaskName="OrgTask1" ResourceName="Excel">
      <TimeRequired>
        <Multiplication Base="OrgTask1_HumanResource_TimeRequired"
    Value="0.2" Unit="minute"/>
      </TimeRequired>
    </ResourceAttribute>
  </AttributeChange>
</TransformationRule>
```

*Figure 14*

```
<InvestmentAndDevelopment Name="Excel license" IsCountable="false"/>
```

*Figure 15*

SYSTEM AND METHOD FOR ANALYZING AND MANAGING BUSINESS PERFORMANCE

CROSS-REFERENCE TO RELATED APPLICATIONS

This application is a continuation of U.S. patent application Ser. No. 11/034,253, filed Jan. 13, 2005, now abandoned, and which is incorporated herein by reference.

BACKGROUND OF THE INVENTION

1. Field of the Invention

The present invention relates to the analysis and management of business performance and, more particularly, to a system and method for analyzing and managing business process performance. The invention identifies business process transformation opportunities of current business processes and applies business transformation patterns by referring to stored knowledge. The thus transformed business processes have superior performance in terms of key business performance indicators such as shorter process cycle time, higher process throughput, lower process cost, or combinations of the above.

2. Background Description

Business process modeling and analysis has been recognized as an effective way for assessing business performance. (See, e.g., M. Laguna and J. Marklund, "Business Process Modeling, Simulation and Design", Prentice Hall, 2004.) A business process is a flow of business tasks, each requiring certain resource demand for the completion of the task. The resource demand is a description of the resources needed for completing a task, which could be a human resource and/or a computer application. When a task requires a human resource, the cost associated with completing the task depends on a number of factors, including the types of human resources assigned to the task and the amount of time required by the task. When a task requires a computer application, the cost associated with completing the task depends on a number of factors, including the type of computer (e.g., mainframes or personal computers) hosting the application and the amount of time the computer spends in processing this task.

After a business process is designed, the performance of the process can be evaluated by analytical methods or computer simulation. Many commercial business process modeling and simulation packages allow users to design business processes and evaluate their performance. Before a simulation can be started, users have to specify a scenario, which includes the rate of source business artifacts entering the process and the information about the number and unit cost of resources of each type. For example, a call-center operator for loan application may cost $10 per hour, a loan underwriting specialist may cost $20 per hour, and a loan approval manager may cost $30 per hour. In addition, for applications running on a mainframe computer, the cost for performing certain types of transactions can be charged based on its usage of physical resources such as 10 milliseconds of central processing unit (CPU) time. At the end of simulation, performance metrics such as resource utilization, process cycle time, and process cost are typically reported.

Current business process modeling and simulation tools have several limitations. One such limitation is that it relies on experienced practitioners to manually construct an improved business process using the current business process modeling and simulation tools. Another limitation is the lack of methods and tools for managing business performance, by updating the models predicting business performance, based on the state of the business. Yet another limitation is the inability to properly capture experiences gained from business transformation projects and reuse them by applying them to new projects. There are additional limitations, as well.

SUMMARY OF THE INVENTION

It is therefore an object of the present invention to provide a system and method for analyzing and managing business performance by designing and evaluating the performance of computer-implemented business process models and performing computer-implemented analysis (e.g., by analytics and/or simulation) in connection with said models.

The invention employs a computer or computer platform to create a model, or business process modeling and analysis environment, to create a business process model comprising a flow of business tasks and artifact sources that generate business artifacts, each of said business tasks and artifact sources being rendered in a machine-readable format which includes a machine-readable identifier and one or more attributes further characterizing each business task and artifact source. Creation of the business process model may involve the use of a model annotation tool capable of annotating business performance models with attributes related to middleware and/or hardware.

The invention enables the loading of transformation knowledge, which may be digitally stored, specifying one or more types of transformation opportunities, each of which may include one or more transformation conditions, one or more transformation rules, and one or more business value attributes comprising at least one of cost and development time.

The invention also enables the parsing of a business process and the identification of transformation opportunities that are parts of the business process meeting one of the transformation conditions, each of which may be specified for each type of transformation opportunity in the transformation knowledge, which may be digitally stored.

The invention further enables the adopting of one or more transformation opportunities identified in parsing business processes and transforming one or more parts of the business process according to corresponding transformation rules, each of which may be specified for each type of transformation opportunity in the transformation knowledge, which may be digitally stored.

Analytics and/or computer simulation may be employed to evaluate investment cost and development time for the transformation according to information on business value attributes comprising cost and/or development time, as specified for each type of transformation opportunity in the transformation knowledge, which may be digitally stored, and other business performance metrics of each of the transformed business processes, such business performance metrics including evaluation of cost, resource utilization, maximum process throughput, and process cycle time. Analytics and/or computer simulation may include a determination of the total cost of ownership of transformed business processes. Analytics and/or computer simulation may also include a computer-implemented analysis of tradeoffs between performance indicators at the business and information technology levels. Analytics and/or computer simulation may further include a model transformation engine capable of expanding annotated business performance models into information technology models by referencing a machine-readable middleware or hardware library, such middleware library containing models of a collection of middleware and such hardware library containing models of a collection of hardware. Data about future business may be input to such models for the computer-implemented prediction of future business performance.

Computer-implemented data processing may be employed to manage the business performance of each of the transformed business processes by making iterative changes to the business processes and reiterating the transformation and evaluation steps until a satisfactory business process is obtained. Ultimately, the resulting output is an improved business process model with respect to the business objective, e.g., shorter process cycle time, higher throughput of business processes, lower cost for processing each instance of the business process, or the combination of the above. In a modified business process, some of the process constructs or their constituent attributes may have been altered.

The resulting business process model may be produced in machine-readable format as output from the computer or computer platform being employed. A business process model thus produced as output in machine-readable format may be deployed to a live computing environment.

Limitations of current business process modeling and simulation tools may thus be addressed by the present invention. For example, the problem of lack of methods and tools for managing business performance by managing business process performance may be solved by providing users with a business process modeling and transformation tool capable of analyzing the performance and cost of the transformed business process, as described above. In addition, the problem of not being able properly to capture experiences gained from business transformation projects, or to reuse such experiences by applying them to new projects, is solved using a knowledge store to capture the experience of business activity transformation, as described above, which makes it possible for business activity in a business process to be transformed by means of enterprise application integration or other methods.

In the preferred embodiments, the computer-implemented modeling employed to evaluate business performance includes both a determination of the total cost of ownership of said transformed business process.

BRIEF DESCRIPTION OF THE DRAWINGS

The foregoing and other objects, aspects and advantages will be better understood from the following detailed description of a preferred embodiment of the invention with reference to the drawings, in which:

FIG. 9 shows conditions of a local part to be an EAI opportunity.

FIG. 10 shows EAI transformation rules including a topology transformation, resource assignment changes, and attribute changes of resources and business artifacts.

FIG. 11 shows information on investment costs and development time for an EAI transformation.

FIG. 13 shows the conditions of a local part to be a "stand-alone application transformation" opportunity.

FIG. 14 shows the transformation rules for "stand-alone application transformation."

FIG. 15 shows information on investment costs for a "stand-alone application transformation."

DETAILED DESCRIPTION OF A PREFERRED EMBODIMENT OF THE INVENTION

Figure 1:
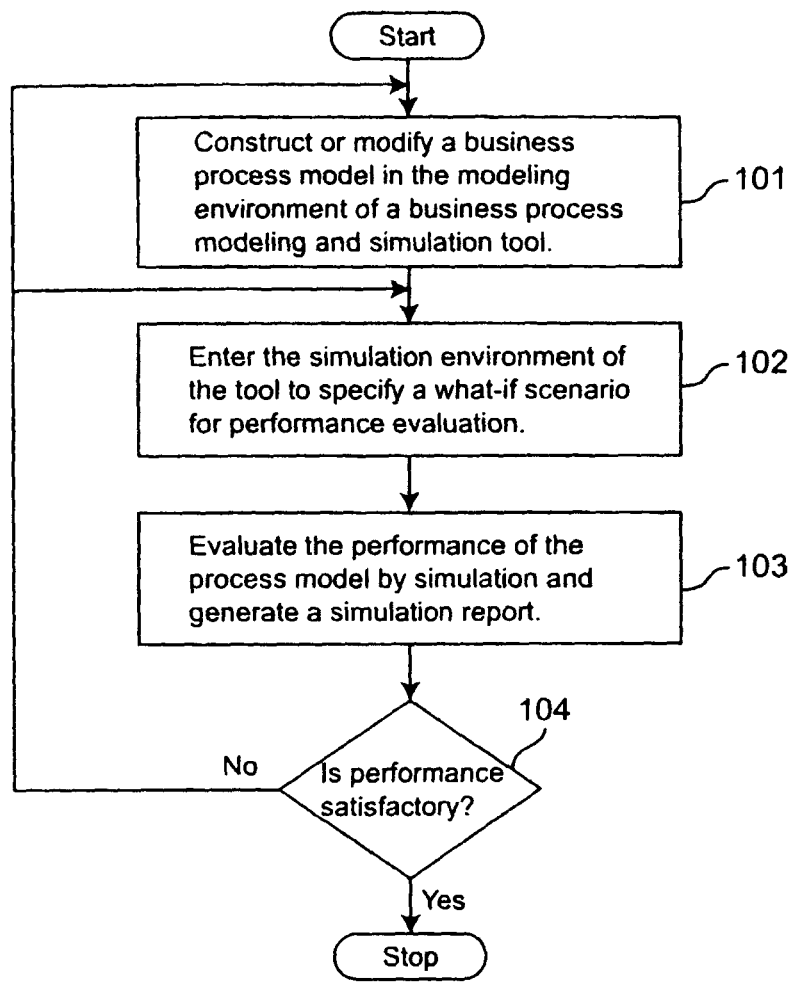
FIG. 1 shows how users design a business process using an integrated modeling and simulation tool.

FIG. 1 shows how users of a prior-art business process modeling and simulation tool can design a business process model (in a modeling environment) and evaluate the performance of the process by discrete event simulation (in a simulation environment). Basically it is an iterative process comprising the steps of creating or modifying a business process model in a modeling environment of business process tool 101, entering the simulation environment of the tool to specify a what-if scenario for performance evaluation 102, evaluating the performance of the process model by simulation and generating a simulation report 103, and checking whether the resulting performance is satisfactory 104.

Figure 2:
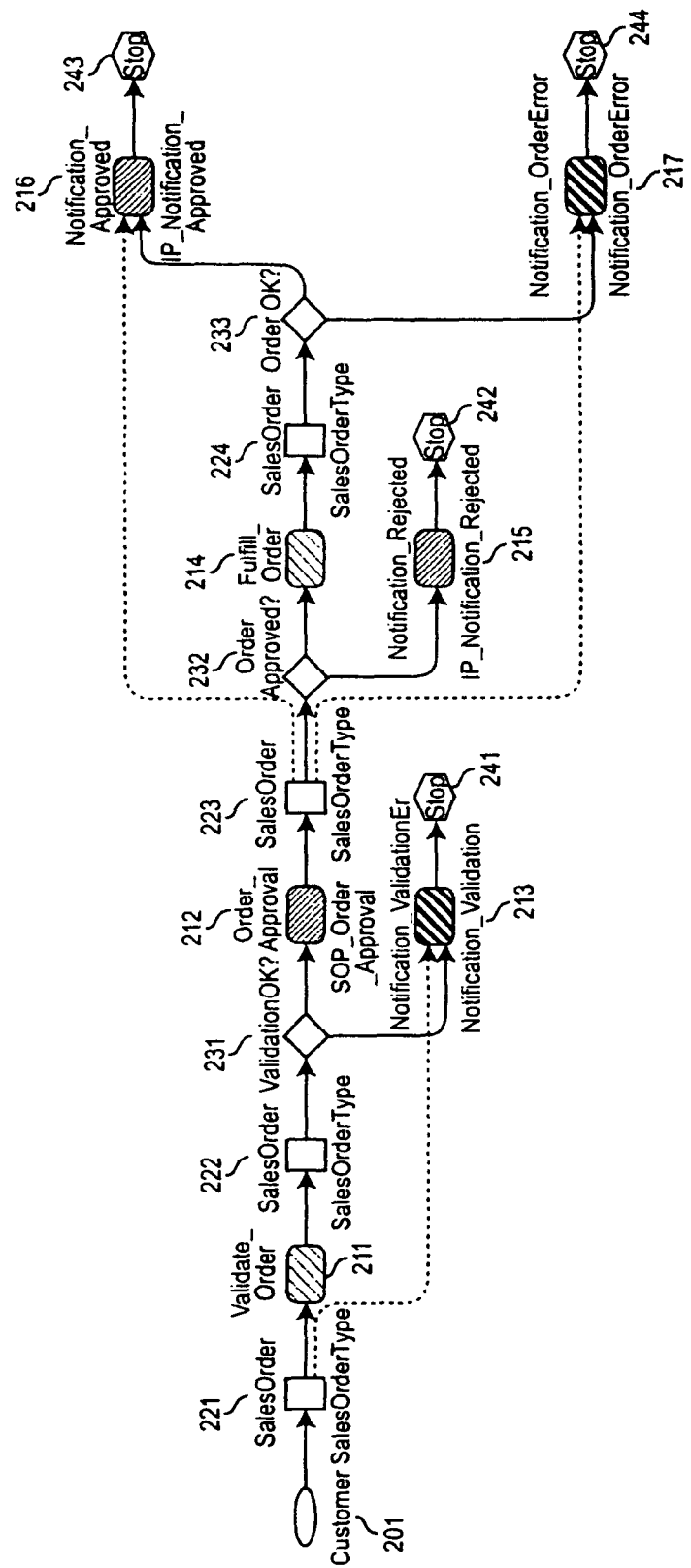
FIG. 2 shows a screenshot of a commercial business process modeling and simulation software as may be employed in the practice of the invention.

Referring to FIG. 2, in the modeling environment, users design a business process model comprising business artifact source 201, business artifacts 221-224, business tasks 211-217 and connectors. Users can add constructs such as decision boxes 231-233 to represent different execution flow in a business process model according to the condition in the decision box. Steps 241-244 indicate end of the business process model. While designing a business process model, users also specify the resource demand required for completing a business task. Resource demand specifies the resource type and the amount of time it will take for the resource of that type to complete a business task. Resources can be human resources or information technology resources such as computer applications. FIG. 2 is an example business process modeling and simulation environment according to the present invention.

In the simulation environment, users can specify a what-if scenario wherein the rate a business artifact source generates business artifacts and the number of resources available for each type of resources is specified. At the end of simulation of the what-if scenario, a report is generated listing the utilization of resources, process cycle time (defined as the average duration from the beginning to the end of the business process), and the average cost of completing an instance of the business process.

Figure 3:
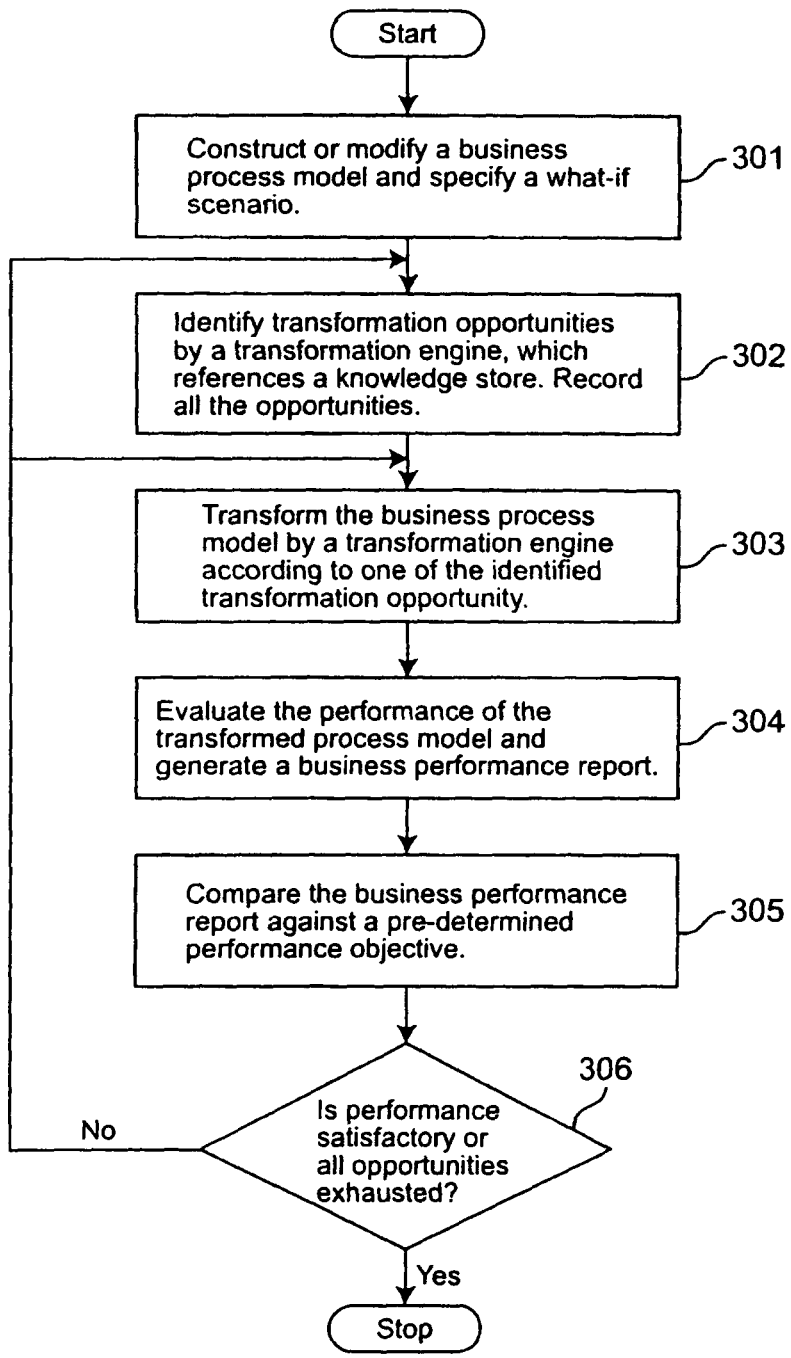
FIG. 3 shows a method for analyzing and managing business process performance with a knowledge store.

The flowchart in FIG. 3 illustrates a method of the invention for analyzing and managing the business process performance. It starts with designing a business process model, which is commonly performed in a business process modeling environment, and specifying a what-if scenario 301, which describes the artifact generation rate and the number of resources for each resource type. The business process can optionally be created by a text editor or XML editor according to the schema of business process models.

In the next step a transformation engine parses the business process model and identifies all the transformation opportunities by referencing a knowledge store. All opportunities are recorded 302. Next the transformation engine transforms the business process model according to one of the identified transformation opportunities 303 that have not been exploited. The performance of the transformed business process model is evaluated by analytics or computer simulation, and a business performance report 304 is generated and compared against a predetermined performance objective 305. If the result is satisfactory or the opportunities are exhausted 306 the process stops; otherwise the transformation engine will evaluate the next opportunity following the same steps.

Figure 4:
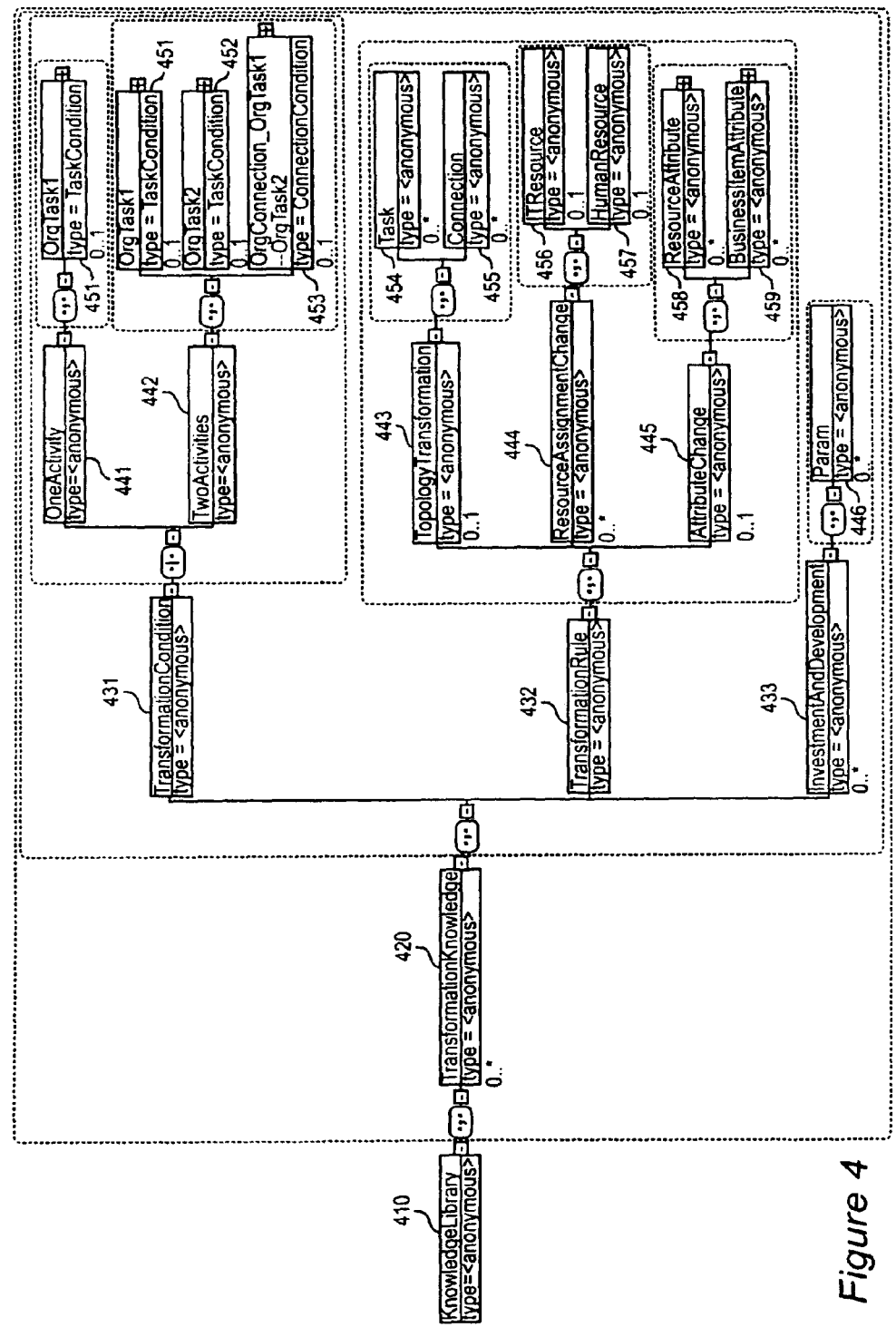
FIG. 4 shows a schema for describing a knowledge store for business process transformations.

In one embodiment of the present invention, a knowledge store represents knowledge for business process transformations. As illustrated in FIG. 4, knowledge for each transformation opportunity includes three types of information: transformation conditions, transformation rules, and investment costs and development time information. Thus, KnowledgeLibrary 410 includes TransformationKnowledge 420, which in turn includes TransformationCondition 431, TransformationRule 432, and InvestmentAndDevelopment 433. TransformationCondition 431 includes OneActivity 441 and TwoActivities 442. TransformationRule 432 includes TopologyTransformation 443, ResourceAssignmentChange 444, and AttributeChange 445. InvestmentAndDevelopment 433 includes Param 446. OneActivity includes OrgTask1 451. TwoActivities 442 includes OrgTask1 451, OrgTask2 452, and OrgConnection_OrgTask1—OrgTask2 453. TopologyTransformation 443 includes Task 454 and Connection 455. ResourceAssignmentChange 444 includes ITResource 456 and HumanResource 457. AttributeChange 445 includes ResourceAttribute 458 and Business Attribute 459.

The transformation engine parses an as-is process and identifies local parts of the as-is process which have transformation opportunities, based on the transformation conditions. That is, the transformation conditions specifies conditions which a local part of an as-is process needs to satisfy to qualify as a transformation opportunity.

Figure 5A:
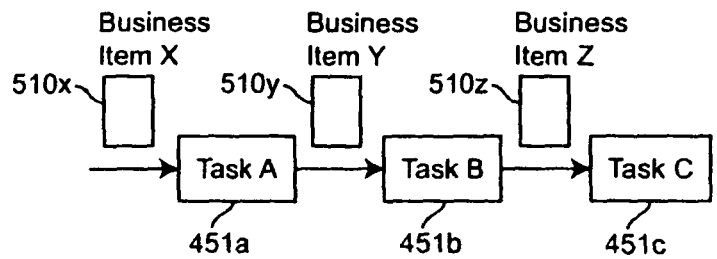
FIG. 5 shows how the transformation engine parses an as-is process.
Figure 5B:
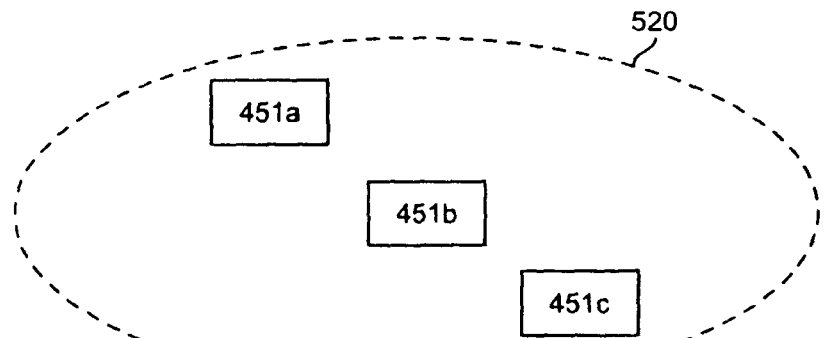
Figure 5C:
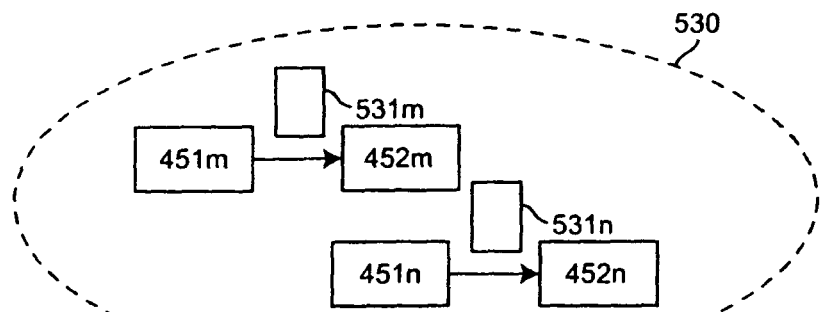

Referring to FIG. 5, FIG. 5(a) illustrates how the transformation engine parses an as-is business process from Business artifact X 510x to Task A 451a, from Business artifact Y 510y to Task B 451b, and from Business Process Z 510z to Task C 451c. FIG. 5(b) shows parsing by one task 520, which encompasses various business artifacts 451a, 451b, 451c. Finally, FIG. 5(c) shows parsing by neighboring two tasks 530 between which a business artifact 531m, 531n is passed from one task 451m, 451n to another task 452m, 452n. Note that parsing by "one task" and by neighboring "two tasks" are examples of the way the transformation engine parses an as-is process. Other types of parsing can be applied to the transformation engine.

In general, business process models have information about tasks, resources, and business artifacts, etc. The transformation engine identifies transformation opportunities by using the information.

Figure 6A:
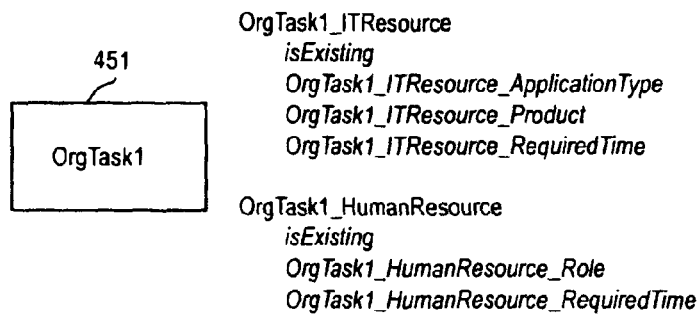
FIG. 6 shows what types of information the transformation engine can get from a local part of an as-is process.

FIG. 6(a) illustrates an example of information that the transformation engine can utilize, when parsing an as-is process by one task. "OrgTask1" 451 refers to the task name. Note that "OrgTask1" is a key word and can be specified as a variable in the transformation knowledge store. (FIG. 4) In runtime, the transformation engine dynamically replaces "OrgTask1" in a transformation knowledge store with the name of the task which the transformation engine picks up.

The task also has information about IT and human resources. From the information on IT and human resources, the transformation engine can figure out whether or not the task is assigned an IT resource and/or a human resource. The information on IT resource includes its application type, product name, and a time duration required to execute the task etc. The information on human resource includes its role name, and a time duration required to execute the task etc. By use of these types of information, users can freely specify the conditions of one task to be a transformation opportunity.

Figure 6B:
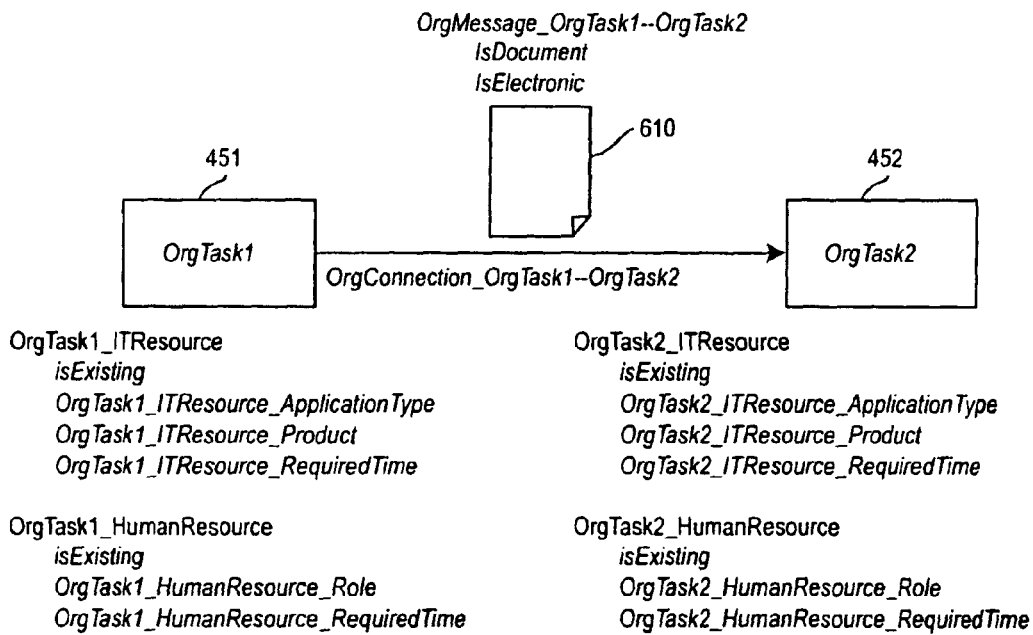

FIG. 6(b) illustrates an example of information that the transformation engine can utilize, when parsing an as-is process by neighboring two tasks between which a business artifact is passed. "OrgTask1" 451 refers to the name of the first task, "OrgTask2" 452 refers to the name of the second task, "OrgConnection_OrgTask1—OrgTask2" 453 refers to the name of the connection between the two tasks, and "OrgMessage_OrgTask1—OrgTask2" 610 refers to the name of the business artifact which is passed between the two tasks. These are key words and can be specified as variables in a transformation knowledge store. In runtime, the transformation engine dynamically replaces the key words in a transformation knowledge store with the concrete names of the tasks, the connection, and the business artifact.

Figure 7:
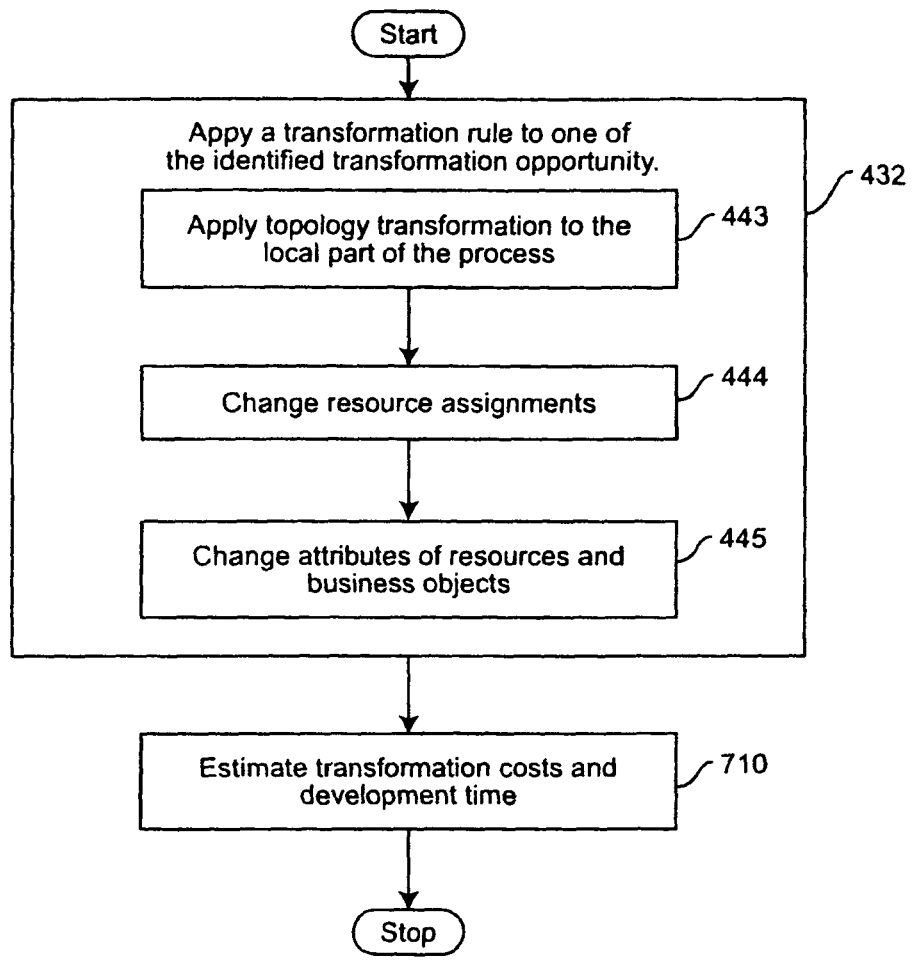
FIG. 7 shows how the transformation engine conduct transformation for a local part of an as-is process.

The two tasks have the same types of information as discussed above for parsing by one task. In case of parsing by neighboring two tasks, the transformation engine can also use information on the connection (or the business artifact). From the information, the transformation engine can figure out whether or not the business artifact is a document, and whether or not the business artifact is electronic, etc. Using the above information, the transformation engine identifies and records all the transformation opportunities. And then, the transformation engine applies the corresponding transformation rule to one of the transformation opportunities. As illustrated in FIG. 7, a transformation rule 432 contains three steps: a topology transformation 443, resource assignment changes 444, and attribute changes of resources and business artifacts 445. FIG. 7 shows how these three steps are performed. The "topology transformation" 443 specifies a new topology by using task names, connection names, and business artifact names. The local part of as-is process is replaced by the new topology. The "resource assignment changes" 444 specifies re-assignments of resources to original tasks and/or new assignments of resources to new tasks which are added by the previous step, the topology transformation 443. The "attribute changes" step 445 specifies changes of attributes of resources and business artifacts.

After the local transformation is complete, the transformation engine estimates several metrics, such as the number of local transformations, the number of new applications, etc, as illustrated in FIG. 7. These metrics are aggregated through all the local transformations, and used for calculation of total investment costs and development time 710 to be taken for the global transformation. Note that the global transformation includes multiple local transformations.

In the following sections, we will illustrate how a business process transformation is conducted by the transformation engine, by use of concrete examples.

Enterprise Application Integration (EAI) Opportunity

An Enterprise Application Integration (EAI) is a solution for electronic data passing between multiple applications with different types of business objects. By transforming paper-form document passing into electronic data passing, several operations such as printing a document, delivering a document, and inputting data into an application become needless; hereby throughputs and operational costs will be improved.

FIG. 8 illustrates an example of a business process including an EAI opportunity. In the first activity, shown in FIG. 8(a), a human interacts with a stand-alone application in OrgTask1 451 and prints out a request 610a. It takes the application $x_1$ minutes and takes the staff $y_1$ minutes to complete OrgTask1 451. In the 2nd activity, OrgTask2 452, a human takes the request on paper 610a and interacts with another stand-alone application to execute the task. It takes the application $x_2$ minutes and takes the staff $y_2$ minutes to complete OrgTask2 452, the second task.

Figure 8A:
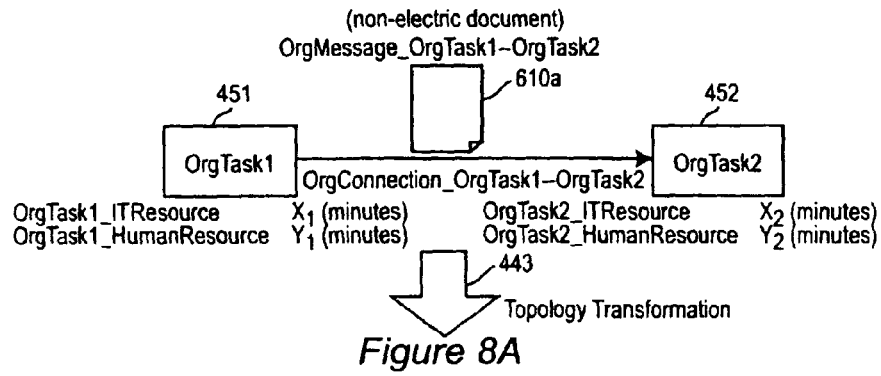
FIG. 8 shows how the transformation engine apply an Enterprise Application Integration (EAI) transformation by use of a knowledge store.
Figure 8B:
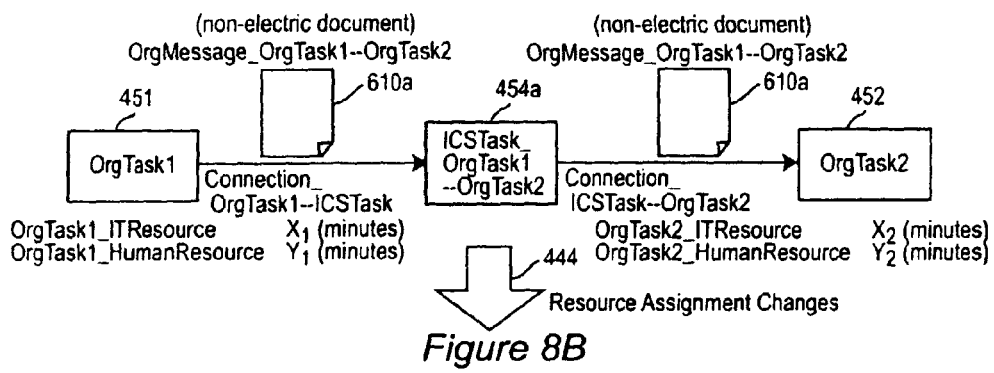
Figure 8C:
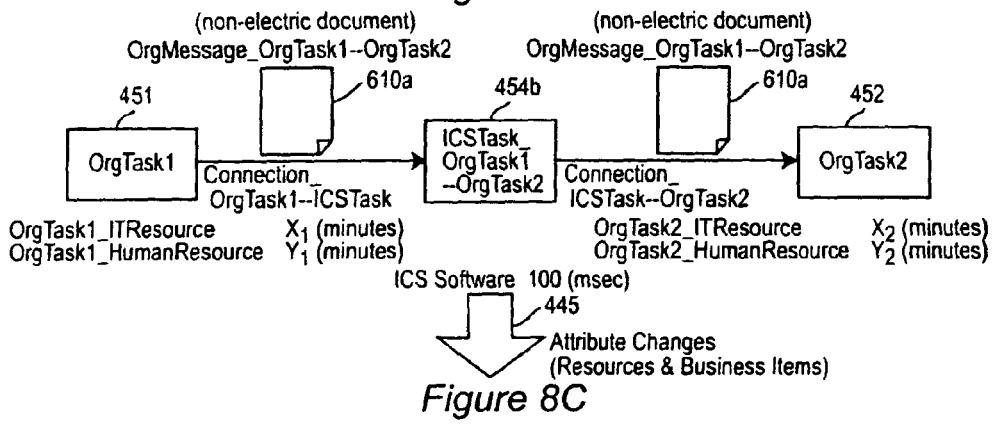
Figure 8D:
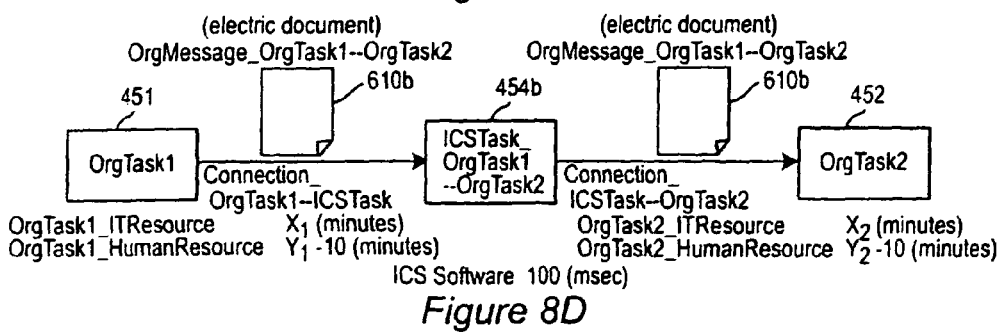

Referring now to the step of topology transformation 443 as shown in FIG. 8(b), an ICS task 454a is added between OrgTask1 451 and OrgTask2 452. Referring now to the step of resource assignment changes 444 as shown in FIG. 8(c), ICS software is assigned to the ICS task 454b. Referring now to the step of attribute changes of resources and business artifacts 445 as shown in FIG. 8(d), the time required by the staff to execute OrgTask1 451 and OrgTask2 452 is reduced by 10 minutes, the time required by the ICS software to execute the ICS task 454b is newly assigned, and input and output of the ICS task 454b become electronic documents 610b instead of paper documents 610a as in FIGS. 8(a)-(c). Note that the specific time saving by introducing ICS software (i.e. 10 minutes in this example) is obtained from the knowledge store that contains historic information regarding business transformation done in the past.

An EAI solution transforms this process into the new process as illustrated in FIG. 8(d). The differences between the as-is and the to-be processes are as follows:

The time for a human to completes the first activity becomes $(y_1-10)$ minutes since there is no need for printing and delivering request (10 minutes).

The time for a human to complete the 2nd activity becomes $(y_2-10)$ minutes since there is no need for entering shipping request (10 minutes) into the logistics application.

An ICS (InterChange Server) task may be added, which involves 2 adapters and 1 collaboration. The input/output of the ICS task is an electronic request.

In addition, to perform this transformation, investment costs and development time are required. The following information is required to estimate the business transformation costs:

ICS software license.
Development of 2 adapters and 1 collaboration.
Maintenance of ICS system.
Hardware cost.

The transformation engine and a business knowledge store enable us to automatically execute the above transformation. Firstly, the transformation engine detects the EAI opportunities by parsing as-is process by neighboring two tasks. That is, if neighboring two tasks meet all the three following conditions, the local part has an EAI opportunity:

(1) Both human resource and IT resource (=application) are assigned to the OrgTask1.
(2) Both human resource and IT resource (=application) are assigned to the OrgTask2.
(3) Business artifact which is passed between the OrgTask1 and the OrgTask2 is non-electronic document.

Referring to FIG. 9, the business knowledge stores contain these three conditions in xml form, as illustrated in the TransformationPointCondition 431a.

Regarding one of the identified EAI opportunities, the EAI transformation is applied, as instructed by the transformation rules in the business knowledge store. As illustrated in FIG. 10, transformation rules 432 includes three parts: a topology transformation 443, changes of resource assignments 444, and changes of attributes 445 of resources 458 and business objects 459. As is the case with other transformations, the EAI transformation requires investment costs and development time. FIG. 11 shows investment and development 433 composed of several items which are relevant to the calculation of investment costs and development time. Note that some items such as an adaptor can be shared by the multiple local EAI transformations, but costs and development time of others depend on the number of the local EAI points to be adopted. In the knowledge store, "isCountable=false" means the item can be shared, and "isCountable=true" means the item cannot be shared. These items are aggregated through all the EAI transformation. Then, based on the aggregated information, the global investment cost and development time are calculated.

In general, the EAI transformation reduces operation cost of human staff, but requires investment costs. Therefore, based on various KPIs and objective functions, the transformation engine will select optimum set of the local EAI opportunities.

Stand-Alone Application Opportunity

Figure 12A:
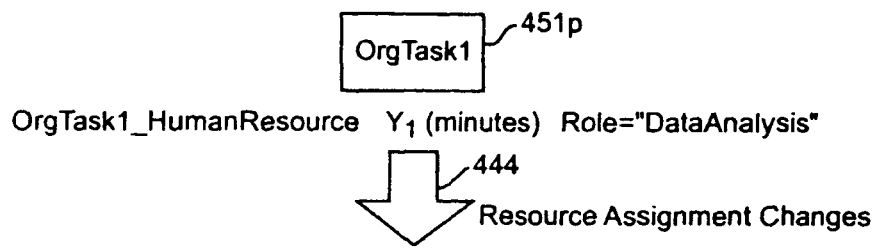
FIG. 12 shows how the transformation engine applies a "stand-alone application transformation" by use of a knowledge store.
Figure 12B:
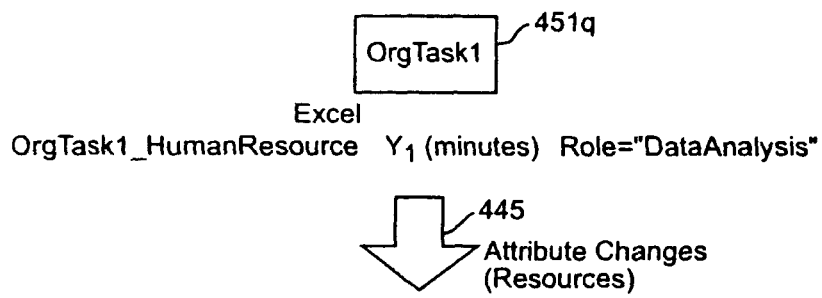
Figure 12C:
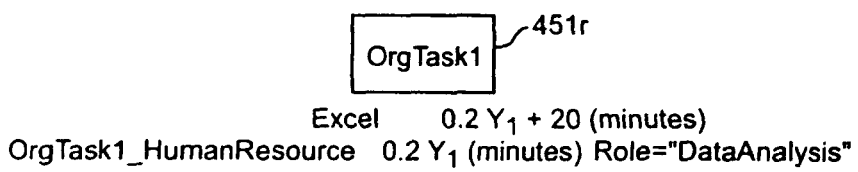

If a task involves only a human resource but can be supported by a stand-alone application, the task has a transformation opportunity. In this case, the transformation engine parses an as-is process by one task, and identifies the opportunity. By referring the role of the human resource of the task, the transformation engine can identify whether or not the task can be supported by a stand-alone application. For example, "DataAnalyst" can work more effectively by use of Excel. FIG. 12(a) illustrates a local part of the as-is process. In the activity, OrgTask1 451 takes the staff $y_1$ minutes. FIG. 12(c) shows the transformation result. In this to-be activity, it takes the stuff $(0.2*y_1+20)$ minutes and takes the Excel $y_1$ minutes. Here the 20 minutes mean a time duration for inputting data into Excel, printing out the result, and delivering the document.) FIG. 13 shows the conditions of a task to be stand-alone application opportunity in xml form. In this transformation 431, there is no topology transformation. Therefore, referring now to FIG. 14, the transformation rule 432 contains only resource assignment changes 444 and attribute changes 445. Referring now to FIG. 12(b), Excel is assigned to OrgTask1 451 in the step of the resource assignment changes. Next, referring now to FIG. 12(c), in the step of the attribute change, required time durations for the staff and for Excel are updated This transformation requires investment cost for the Excel license, as illustrated in FIG. 15.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for analyzing and managing business performance by designing and evaluating the performance of business process models, comprising the steps of:

using a computer or computer platform to create a business process model comprising a flow of business tasks and artifact sources that generate business artifacts, each of said business tasks and artifact sources being rendered in a machine-readable format which includes a machine-readable identifier and one or more attributes further characterizing each business task and artifact source;

loading into said computer or computer platform digitally-stored transformation knowledge specifying one or more types of transformation opportunities for said flow of business tasks, each of which comprises one or a plurality of transformation conditions, one or a plurality of transformation rules, and one or a plurality of business value attributes for the business tasks in said flow of business tasks comprising at least one of cost and development time;

rendering said business tasks and artifact sources in a machine-readable format which includes a machine readable identifier and attributes characterizing each business task and artifact source;

parsing by the computer the rendered business tasks and artifact sources;

identifying by the computer from said parsing one or more transformation opportunities within said flow of business tasks that are parts of the business process meeting one of the transformation conditions of said types of transformation opportunities, each of which is specified for each type of transformation opportunity in said digitally-stored transformation knowledge;

adopting one or more transformation opportunities that are identified in the previous step and transforming by the computer the parts of the business process according to the corresponding transformation rules, each of which is specified for each type of transformation opportunity in said digitally-stored transformation knowledge;

employing one of analytics and computer simulation to evaluate investment cost and development time for the transformation according to the information on business value attributes comprising at least one of cost and development time that is specified for each type of transformation opportunity in said digitally-stored transformation knowledge, and other business performance metrics of each of said transformed business processes, said business performance metrics including evaluation of cost, resource utilization, maximum process throughput, and process cycle time;

employing data processing in said computer or computer platform to manage the business performance of each of said transformed business processes by making iterative changes to said business processes or artifact sources and reiterating said transformation and evaluation steps until a satisfactory business process model is obtained; and producing as output from said computer or computer platform a business process model in machine-readable format.

2. The method according to claim 1, wherein said business process model produced as output is deployed to a live computing environment.

3. The method according to claim 1, wherein said analytics and computer simulation include a determination of the total cost of ownership of said transformed business process.

4. The method according to claim 1, wherein said analytics and computer simulation include a computer implemented analysis of tradeoffs between performance indicators at the business and information technology levels.

5. The method according to claim 1, wherein said step of creating a business process model includes the use of a model annotation tool capable of annotating said business performance models with attributes related to middleware and hardware.

6. The method according to claim 5, wherein said analytics and computer simulation include a model transformation engine capable of expanding said annotated business performance models into information technology models by referencing a machine-readable middleware or hardware library, said middleware library containing models of a collection of middleware and said hardware library containing models of a collection of hardware.

7. The method according to claim 6, wherein data about future business is input to said models for the computer-implemented prediction of future business performance.

8. A system for analyzing and managing business performance by designing and evaluating the performance of business process models, comprising:

a computer or computer platform, employed to create a business process model comprising a flow of business tasks and artifact sources that generate business artifacts, each of said business tasks and artifact sources being rendered in a machine-readable format which includes a machine-readable identifier and one or more attributes further characterizing each business task and artifact source;

digitally-stored transformation knowledge loaded into said computer or computer platform specifying one or more types of transformation opportunities for said flow of business tasks, each of which comprises one or a plurality of transformation conditions, one or a plurality of transformation rules, and one or a plurality of business value attributes for the business tasks in said flow of business tasks comprising at least one of cost and development time;

means for rendering said business tasks and artifact sources in a machine-readable format which includes a machine readable identifier and attributes characterizing each business task and artifact source;

means for parsing the rendered business tasks and artifact sources;

means for identifying one or more transformation opportunities within said flow of business tasks that are parts of the business process meeting one of the transformation conditions of said types of transformation conditions, each of which is specified for each type of transformation opportunity in said digitally-stored transformation knowledge;

means for adopting one or more transformation opportunities that are identified in parsing the business process and transforming the parts of the process according to the corresponding transformation rules each of which is specified for each type of transformation opportunity in said digitally-stored transformation knowledge;

means for employing one of analytics and computer simulation to evaluate investment cost and development time for the transformation according to the information on business value attributes comprising at least one of cost and development time that is specified for each type of transformation opportunity in said digitally-stored transformation knowledge, and business performance metrics of each of said transformed business processes, said business performance metrics including evaluation of cost, resource utilization, maximum process throughput, and process cycle time, a data processor employed to manage the business performance of each of said transformed business processes by making iterative changes to said business processes or artifact sources and reiterating said transformation and evaluation steps until a satisfactory business process is obtained, and means for producing a business process model in machine-readable format produced as output.

9. The system according to claim 8, wherein said business process model produced as output is deployed to a live computing environment.

10. The system according to claim 8, wherein said analytics and computer simulation include a determination of the total cost of ownership of said transformed business process.

11. The system according to claim 8, wherein said analytics and computer simulation include analysis of tradeoffs between performance indicators at the business and information technology levels.

12. The system according to claim 8, wherein creation of said business process model includes the use of a model annotation tool capable of annotating said business performance models with attributes related to middleware and hardware.

13. The system according to claim 12, wherein said analytics and computer simulation include a computer-implemented model transformation engine capable of expanding said annotated business performance models into information technology models by referencing a middleware or hardware library, said middleware library containing models of a collection of middleware and said hardware library containing models of a collection of hardware.

14. The system according to claim 13, wherein data about future business is input to said models for the computer-implemented prediction of future business performance.

* * * * *